US011611867B2

(12) United States Patent
Liu et al.

(10) Patent No.: US 11,611,867 B2
(45) Date of Patent: Mar. 21, 2023

(54) VSIM MODULE FOR PORTABLE APPARATUS

(71) Applicant: Simo Holdings Inc., Grand Cayman (KY)

(72) Inventors: Jing Liu, Mountain View, CA (US); Ludovic Lassauce, Singapore (SG); Richard H. Xu, San Jose, CA (US); Zhen Zhang, Guangdong (CN)

(73) Assignee: Simo Holdings Inc., Grand Cayman (KY)

( * ) Notice: Subject to any disclaimer, the term of this patent is extended or adjusted under 35 U.S.C. 154(b) by 0 days.

(21) Appl. No.: 17/243,606

(22) Filed: Apr. 29, 2021

(65) Prior Publication Data

US 2022/0322070 A1    Oct. 6, 2022

(51) Int. Cl.

| | |
|---|---|
| *H04W 60/00* | (2009.01) |
| *H04W 8/20* | (2009.01) |
| *H04W 76/10* | (2018.01) |
| *H04W 8/08* | (2009.01) |
| *H04W 8/18* | (2009.01) |
| *H04W 48/18* | (2009.01) |

(52) U.S. Cl.
CPC .............. *H04W 8/205* (2013.01); *H04W 8/08* (2013.01); *H04W 8/183* (2013.01); *H04W 48/18* (2013.01); *H04W 60/00* (2013.01); *H04W 76/10* (2018.02)

(58) Field of Classification Search
CPC ....... H04W 88/06; H04W 12/06; H04W 4/60; H04W 12/45; H04W 12/35; H04W 12/42; H04W 8/205; H04W 8/08; H04W 8/183; H04W 48/18; H04W 60/00; H04W 76/10; H04M 15/7556
USPC ........................................................ 370/329
See application file for complete search history.

(56) References Cited

U.S. PATENT DOCUMENTS

| | | |
|---|---|---|
| 9,161,325 B1 | 10/2015 | Urbanek |
| 2015/0072616 A1 | 3/2015 | Rong et al. |
| 2016/0323256 A1* | 11/2016 | Shahidi .................. H04L 63/18 |
| 2017/0134298 A1* | 5/2017 | Walke ..................... H04W 4/50 |
| 2018/0234834 A1 | 8/2018 | Stein |
| 2021/0021694 A1 | 1/2021 | Malkawi |

FOREIGN PATENT DOCUMENTS

| | | |
|---|---|---|
| WO | 2016175972 A1 | 11/2016 |
| WO | 2017016058 A1 | 2/2017 |

* cited by examiner

*Primary Examiner* — Huy C Ho
(74) *Attorney, Agent, or Firm* — ScienBiziP, P.C.

(57) ABSTRACT

The present invention provides a vSIM module for a portable apparatus. The portable apparatus at least includes a slot. The vSIM module comprises a radio frequency chip, a baseband processor, a memory, an application processor, and a connector. The radio frequency chip is couple to an antenna. The baseband processor is coupled to the radio frequency chip. The memory is configured to store a vSIM connectivity management program. The application processor is coupled to the memory for executing the vSIM connectivity management program. The connector is configured to connect with the slot of the portable apparatus. When the vSIM connectivity management program is executed by the application processor, a vSIM service is activated.

8 Claims, 4 Drawing Sheets

VSIM MODULE FOR PORTABLE APPARATUS

CROSS-REFERENCE TO RELATED APPLICATIONS

This application claims the benefit of China Patent Application No. 202110356373.2 filed on Apr. 1, 2021, which is hereby incorporated by reference herein and made a part of specification.

FIELD

The invention relates to a vSIM module, and more particularly, to a vSIM module for a portable apparatus.

BACKGROUND

With the development of network technology, many apparatuses can be connected to a network to obtain more network services. Currently, portable apparatuses can be connected to a network via an SIM card or eSIM technology.

However, the current SIM card or eSIM technology does not allow the user's portable apparatus to access other networks within a country, and can only access a network provided by a network service provider through the SIM card or eSIM profile provided by the network service provider. If the user intends to access other networks, he/she needs to purchase a SIM card or subscription provided by other network service providers, and manually replace the SIM card or eSIM profile in the portable apparatus so as to access the networks provided by other network service providers.

In addition, the current SIM card or eSIM technology does not allow the user's portable apparatus to access networks in a different country. If the user intends to access networks in a different country, he/she also needs to purchase a SIM card or subscription provided by network service providers in a different country, and manually replace the SIM card or eSIM profile in the portable apparatus so as to access the networks provided by network service providers in a different country.

In addition, the current SIM card module or eSIM module has a disadvantage, that is, a dedicated SIM management program and a complex driver (e.g., MBIM driver) need to be developed in the operating system (e.g., Windows operating system or Chrome operating system) of the user's portable apparatus so as to manage the SIM card and network connection information.

Due to the above disadvantage of the current SIM card module or eSIM module, it causes inconvenience to developers at the development side and to users at the use side.

SUMMARY

The invention relates to a vSIM module for a portable apparatus. The vSIM module can be embedded in or externally connected to the portable apparatus, and can achieve the advantage that the portable apparatus can access other networks within a country or access networks in a different country without manually replace the SIM card. In addition, the developer does not need to develop a dedicated SIM management program and a complex driver in the operating system of a portable apparatus.

According to an embodiment of the present invention, a vSIM module for a portable apparatus is provided. The portable apparatus at least includes a slot. The vSIM module comprises a radio frequency chip, a baseband processor, a memory, an application processor, and a connector. The radio frequency chip is couple to an antenna. The baseband processor is coupled to the radio frequency chip. The memory is configured to store a vSIM connectivity management program. The application processor is coupled to the memory for executing the vSIM connectivity management program. The connector is configured to connect with the slot of the portable apparatus. When the vSIM connectivity management program is executed by the application processor, a vSIM service is activated.

According to another embodiment of the present invention, a portable apparatus is provided. The portable apparatus at least includes a slot and a vSIM module. The vSIM module comprises a radio frequency chip, a baseband processor, a memory, an application processor, and a connector. The radio frequency chip is couple to an antenna. The baseband processor is coupled to the radio frequency chip. The memory is configured to store a vSIM connectivity management program. The application processor is coupled to the memory for executing the vSIM connectivity management program. The connector is configured to connect with the slot of the portable apparatus. When the vSIM connectivity management program is executed by the application processor, a vSIM service is activated.

BRIEF DESCRIPTION OF THE DRAWINGS

The above and other features of the present invention will become more apparent with the following detailed description in conjunction with the accompanying drawings.

DETAILED DESCRIPTION OF THE PREFERRED EMBODIMENTS

The present invention will be described in detail with reference to the accompanying drawings and specific implementations. It should be noted that the present invention should not be limited to the specific embodiments described below. In addition, for the sake of simplicity, detailed descriptions of well-known technologies that are not directly related to the present invention are omitted in order to prevent confusion in understanding the present invention.

Figure 1:
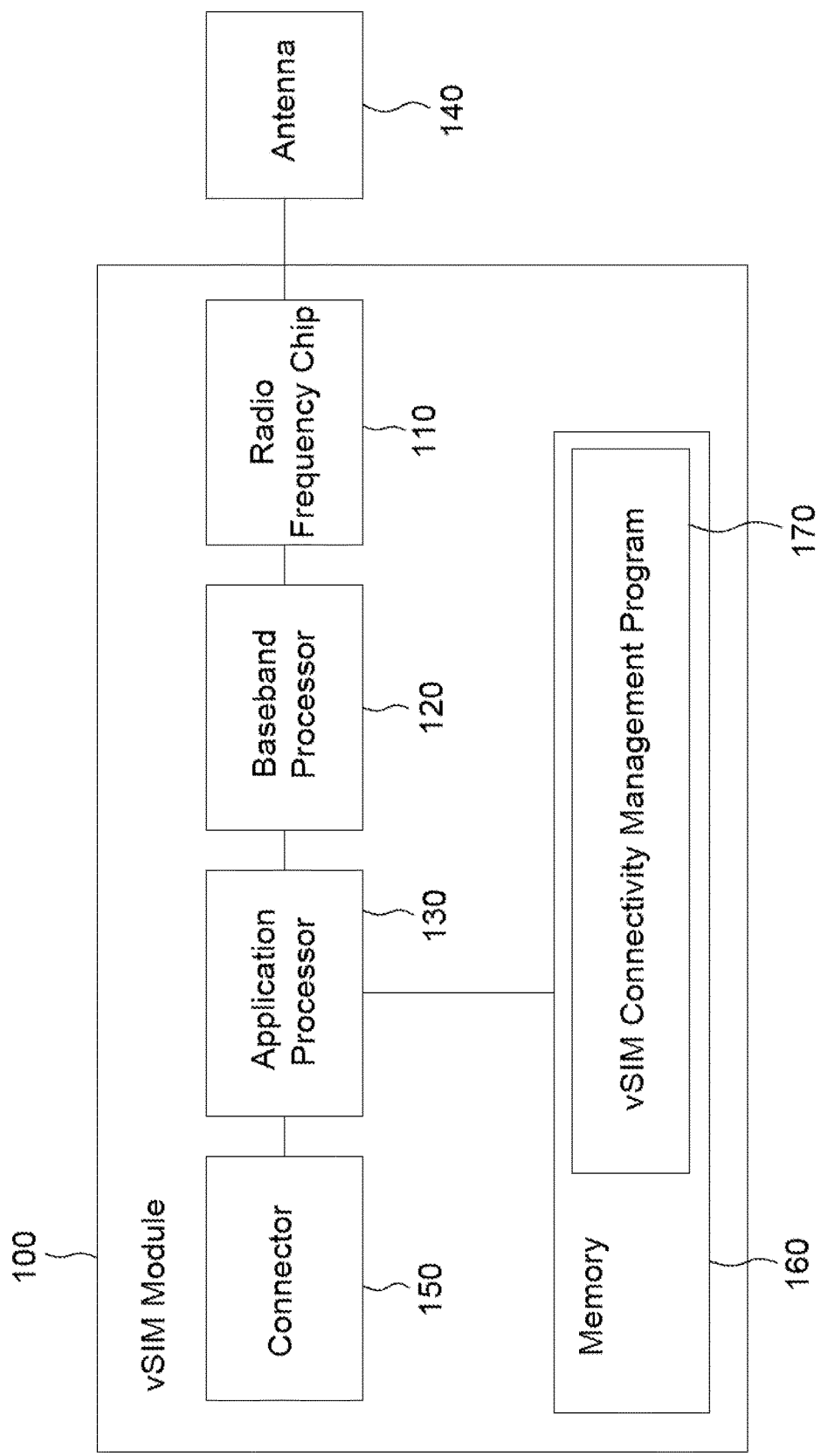
FIG. 1 is a block diagram of a vSIM module according to an embodiment of the present invention.

Referring to FIG. 1, it shows a block diagram of a vSIM module 100 according to an embodiment of the present invention. The vSIM module 100 includes a radio frequency (RF) chip 110, a baseband processor (BP) 120, an application processor (AP) 130, an antenna 140, a connector 150, and a memory 160. The RF chip 110 is coupled to the antenna 140 and the baseband processor 120. The application processor 130 is coupled to the baseband processor 120, the connector 150, and the memory 160.

The memory 160 is, for example, a non-transitory computer-readable storage medium. The memory 160 stores a vSIM connectivity management program 170. The vSIM connectivity management program 170 may be implemented as instructions executed by the application processor 130.

The radio frequency chip 110 is coupled to the antenna 140 for receiving and transmitting signals.

The baseband processor 120 is configured to execute conversion between a digital signal and an analog signal, modulation or coding for digital signals, and the like.

The application processor 130 is configured to execute the vSIM connectivity management program 170 to activate a vSIM service.

The connector 150 is, for example, a connector of an M.2 interface or a connector of a USB interface, but the present invention is not limited thereto.

In one embodiment, the radio frequency chip 110, the baseband processor 120, the application processor 130, and the memory 160 may be implemented as a System on a Chip (SoC).

Figure 2:
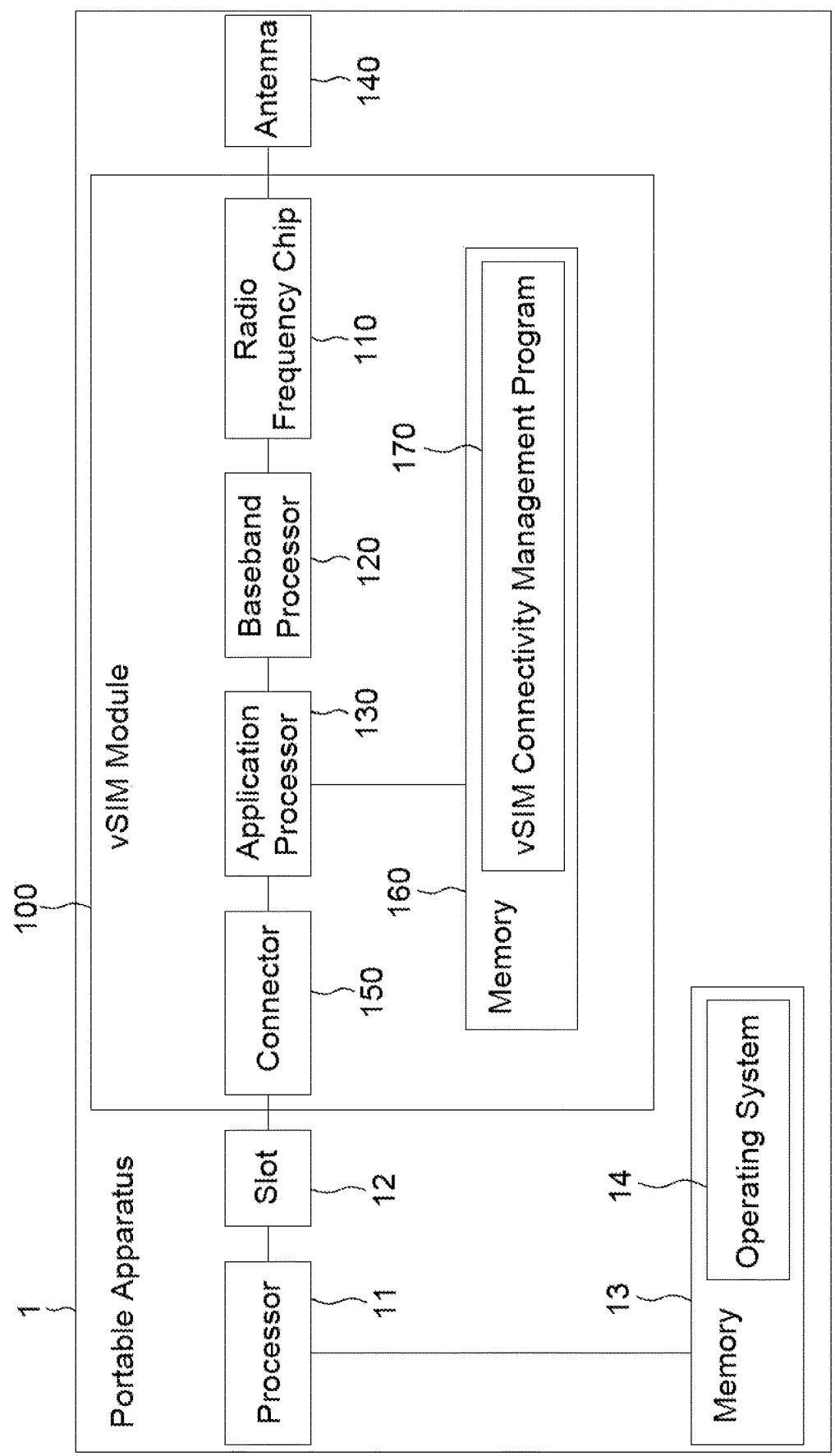
FIG. 2 is a schematic diagram of a vSIM module embedded in a portable apparatus according to an embodiment of the present invention.

Please refer to FIG. 2. FIG. 2 is a schematic diagram of a vSIM module 100 embedded in a portable apparatus 1 according to an embodiment of the present invention. The portable apparatus 1 includes a processor 11, a slot 12, and a memory 13. The portable apparatus 1 may be, for example, a notebook computer, a smartphone, a smart watch, a smart bracelet, a tablet computer, etc. The memory 13 is, for example, a non-transitory computer-readable storage medium. The memory 13 may store an operating system 14, such as Windows operating system or Chrome operating system. The processor 11 may run this operating system 14. The slot 12 is provided in the portable apparatus 1 and is, for example, a slot of an M.2 interface, but the present invention is not limited thereto. The vSIM module 100 can be connected to the slot 12 of the portable apparatus 1 via the connector 150 so as to be embedded in the portable apparatus 1. When the vSIM module 100 is connected to the slot 12 of the portable apparatus 1 via the connector 150, the portable apparatus 1 and the vSIM module 100 can transmit data to each other for communication.

Figure 3:
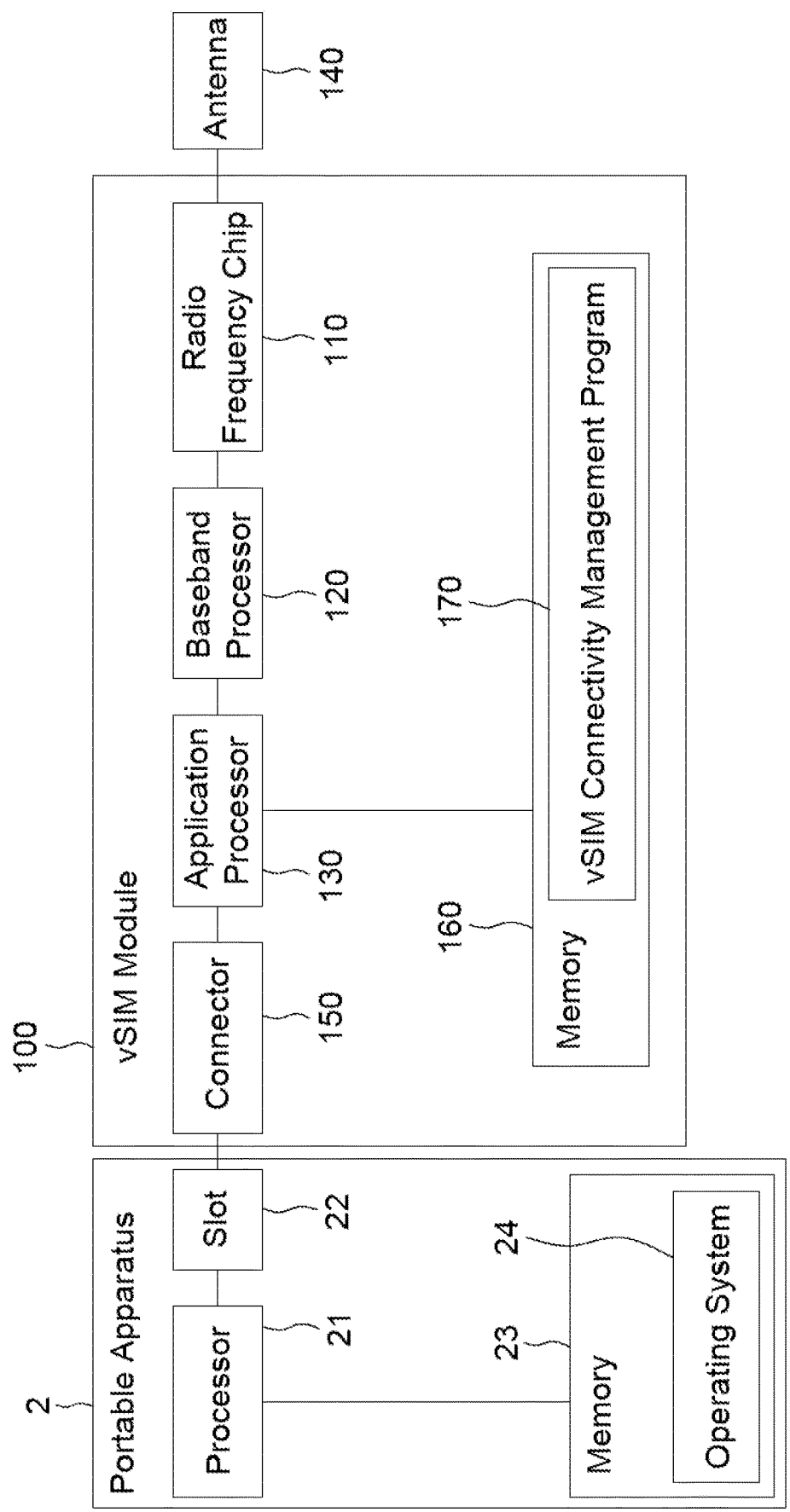
FIG. 3 is a schematic diagram of a vSIM module externally connected to a portable apparatus according to an embodiment of the present invention.

Please refer to FIG. 3. FIG. 3 is a schematic diagram of a vSIM module 100 externally connected to a portable apparatus 2 according to an embodiment of the present invention. The portable apparatus 2 includes a processor 21, a slot 22, and a memory 23. The portable apparatus 2 may be, for example, a notebook computer, a smartphone, a smart watch, a smart bracelet, a tablet computer, etc. The memory 23 is, for example, a non-transitory computer-readable storage medium. The memory 23 may store an operating system 24, such as Windows operating system or Chrome operating system. The processor 22 may run this operating system 24. The slot 22 is provided in the portable apparatus 2 and is, for example, a slot of a USB interface, but the present invention is not limited thereto. The vSIM module 100 can be connected to the slot 22 of the portable apparatus 2 via the connector 150 so as to be externally connected to the portable apparatus 2. When the vSIM module 100 is connected to the slot 22 of the portable apparatus 2 via the connector 150, the portable apparatus 2 and the vSIM module 100 can transmit data to each other for communication.

Figure 4:
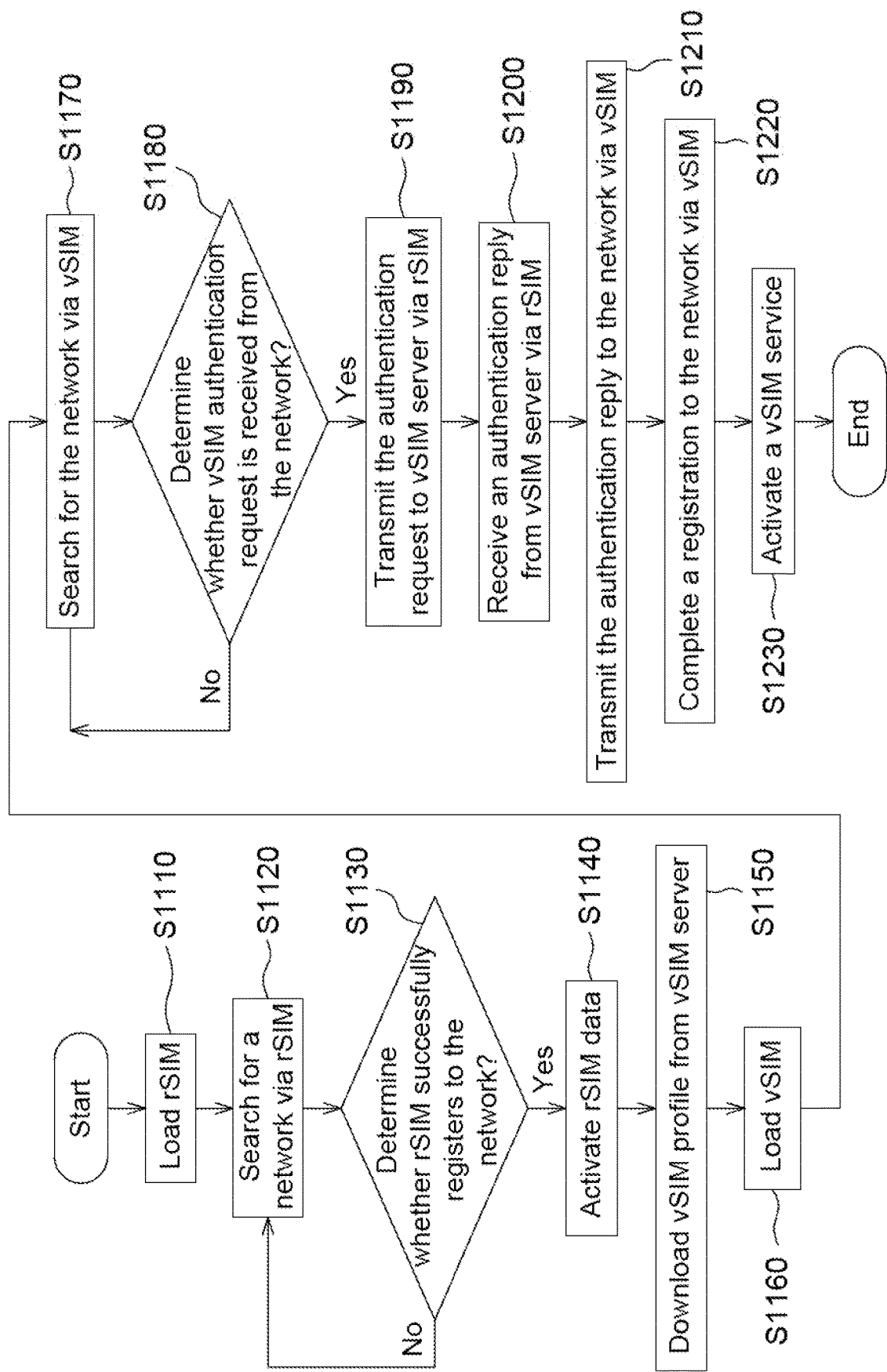
FIG. 4 is a flowchart of a vSIM connectivity management program executed to activate a vSIM service according to an embodiment of the present invention.

Please also refer to FIGS. 2,3 and 4. FIG. 4 is a flowchart of a vSIM connectivity management program 170 executed to activate a vSIM service according to an embodiment of the present invention.

In step S1110, an rSIM (Remote SIM) is loaded. In one embodiment, the rSIM may be implemented as a physical card and inserted into a card slot (not shown) of the portable apparatus or the vSIM module 100. In another embodiment, the rSIM may be implemented as a software card and stored in the memory of the vSIM module 100. The rSIM is configured to connect to a network before downloading a vSIM profile from a vSIM server, and configured to assist in completing a vSIM authentication (for example, a vSIM authentication request is transmitted to the vSIM server via the rSIM, and a vSIM authentication reply is received from the vSIM server via the rSIM) in a procedure where the vSIM searches for the network.

In step S1120, a network is searched via the rSIM.

In step S1130, it is determined whether the rSIM successfully registers to the network. If yes, execute step S1140, and if no, return to step S1120.

In step S1140, rSIM data is activated.

In step S1150, a vSIM profile is downloaded from a vSIM server.

In step S1160, a vSIM is loaded. The vSIM may be a software card and stored in the memory of the vSIM module 100.

In step S1170, the network is searched via the vSIM.

In step S1180, it is determined whether a vSIM authentication request is received from the network. If yes, execute step S190, and if not, return to step S170.

In step S1190, the vSIM authentication request is transmitted to a vSIM server via the rSIM.

In step S1200, a vSIM authentication reply is received from the vSIM server via the rSIM.

In step S1210, the vSIM authentication reply is transmitted to the network via the vSIM.

In step S1220, a registration to the network is completed via the vSIM.

In step S1230, a vSIM service is activated (for example, a network provided by a foreign network service provider is connected).

In addition, in one embodiment, the vSIM module 100 for a portable apparatus disclosed in the present disclosure may operate together with a vSIM application program. Please refer to FIG. 2. Referring to FIG. 2, the vSIM application program may be installed on the operating system 14 of the portable apparatus 1 and stored in the memory 13 (not shown), and the processor 11 may run the vSIM application program. The vSIM application program is configured to provide the user with various management and control functions for the vSIM so as to provide the user with a better use experience. In one embodiment, the various management and control functions for the vSIM include, for example, managements and controls for the name of the operator to which the current vSIM belongs, the Cell ID in which the vSIM resides, and the signal strength, and the like.

In this way, the vSIM module 100 for a portable apparatus disclosed by the present disclosure can be embedded in or externally connected to the portable apparatus, and can activate a vSIM service so as to achieve the advantage that the portable apparatus can access other networks within a country or access networks in a different country without manually replace the SIM card. In addition, the developer does not need to develop a dedicated SIM management program and a complex driver (e.g., MBIM driver) in the operating system of a portable apparatus to manage the SIM card and network connection information.

As described above, the embodiments of the present invention have been described in detail with reference to the accompanying drawings. However, the specific structure is not limited to the embodiments described above, and the present invention also includes any design changes without departing from the spirit of the present invention. In addition, various modifications can be made to the present invention within the scope of the claims, and embodiments obtained by appropriately combining the technical means disclosed in different embodiments are also included in the technical scope of the present invention. In addition, components having the same effect described in the above embodiments may be substituted for each other.

What is claimed is:

1. A virtual Subscriber Identity Module (vSIM) for a portable apparatus that includes at least a slot, the vSIM comprising:
   a radio frequency chip coupled to an antenna;
   a baseband processor coupled to the radio frequency chip;
   a memory configured to store a vSIM connectivity management program;
   an application processor coupled to the memory for executing the vSIM connectivity management program; and
   a connector configured to connect with the slot of the portable apparatus, wherein when the vSIM connectivity management program is executed by the application processor, the following operations are performed to activate a vSIM service:
      loading an remote Subscriber Identity Module (rSIM), the rSIM being a software card stored in the memory of the vSIM,
      registering to a network via the rSIM,
      searching for the network via the vSIM,
      performing a vSIM authentication procedure via the rSIM in response to an acceptance of a vSIM authentication request from the network,
      completing a registration to the network via the vSIM after completing the vSIM authentication procedure, and
      activating the vSIM service.

2. The vSIM according to claim 1, wherein the slot and the connector comprise an M.2 interface, and the vSIM is embedded in the portable apparatus.

3. The vSIM according to claim 1, wherein the slot and the connector comprise a Universal Serial Bus (USB) interface, and the vSIM is externally connected to the portable apparatus.

4. The vSIM module according to claim 1, wherein performing the vSIM authentication procedure comprises: executed by the application processor, the following steps are performed to activate the vSIM service:
   loading an rSIM;
   searching for a network via the rSIM;
   successfully registering to the network by the rSIM;
   activating rSIM data;
   downloading a vSIM profile from a vSIM server;
   transmitting the vSIM authentication request to a vSIM server via the rSIM;
   receiving a vSIM authentication reply from the vSIM server via the rSIM; and
   transmitting the vSIM authentication reply to the network via the vSIM.

5. A portable apparatus, comprising:
   a slot; and
   a virtual Subscriber Identity Module (vSIM), comprising:
   a radio frequency chip coupled to an antenna;
   a baseband processor coupled to the radio frequency chip;
   a memory configured to store a vSIM connectivity management program;
   an application processor coupled to the memory for executing the vSIM connectivity management program; and
   a connector configured to connect with the slot, wherein when the vSIM connectivity management program is executed by the application processor, the following operations are performed to activate a vSIM service:
      loading an remote Subscriber Identity Module (rSIM), the rSIM being a software card stored in the memory of the vSIM,
      registering to a network via the rSIM,
      searching for the network via the vSIM,
      performing a vSIM authentication procedure via the rSIM in response to an acceptance of a vSIM authentication request from the network,
      completing a registration to the network via the vSIM after completing the vSIM authentication procedure, and
      activating the vSIM service.

6. The portable apparatus according to claim 5, wherein the slot and the connector comprise an M.2 interface, and the vSIM is embedded in the portable apparatus.

7. The portable apparatus according to claim 5, wherein the slot and the connector comprise a Universal Serial Bus (USB) interface, and the vSIM is externally connected to the portable apparatus.

8. The portable apparatus according to claim 5, wherein performing the vSIM authentication procedure comprises:
   downloading a vSIM profile from a vSIM server;
   transmitting the vSIM authentication request to a vSIM server via the rSIM;
   receiving a vSIM authentication reply from the vSIM server via the rSIM; and
   transmitting the vSIM authentication reply to the network via the vSIM.

* * * * *